United States Patent Office 2,728,790
Patented Dec. 27, 1955

2,728,790

CATALYZED PROCESS FOR PREPARATION OF PHOSPHATES AND PHOSPHITES

Cyrus Efrem Sroog, Grand Island, N. Y., assignor to E. I. du Pont de Nemours and Company, Wilmington, Del., a corporation of Delaware No Drawing. Application March 11, 1954,
Serial No. 415,683

10 Claims. (Cl. 260—461)

This invention relates to the preparation of organic phosphates and phosphites, and, more particularly, to the process of reacting alkyl, alkyl phenyl, and phenyl phosphates and phosphites with glycols.

The use of organic phosphates and phosphites as antistatic and fireproofing agents, stabilizers and plasticizers for polymerization reactions, and as intermediates in certain chemical reactions, is well known to the art. Such a group of useful organo-phosphorus compounds are reaction products of alkyl, alkyl phenyl, or phenyl phosphates and phosphites and glycols. These compounds are particularly valuable as additives to polymerization reactions run under reduced pressure and requiring the presence of varying percentages of phosphorus compounds. Because of the relatively high boiling point of these reaction mixtures, they can be introduced as substitutes for lower boiling alkyl phosphates or phosphites into polymerization reactions run under vacuum and high temperatures without fear of being removed from the reaction system. Heretofore, attempts to synthesize these compounds by simple mixture of a glycol and an organic phosphate or phosphite, and heating, resulted only in the incomplete reaction of the glycol and the phosphate or phosphite with the resulting undesirable excess dehydration and darkening of the glycol.

It is an object of this invention, therefore, to provide an improved process for reacting alkyl, alkyl phenyl, and phenyl phosphates and phosphites with glycols which is not subject to the disadvantages of the process noted above. It is a further object to prepare the reaction products of alkyl, alkyl phenyl and phenyl phosphates and phosphites with glycols more efficiently and more economically than has heretofore been possible. These and other objects will be apparent from the description of the invention given hereinafter.

The above objects are accomplished in accordance with the present invention which, briefly stated, comprises reacting a glycol of the series $HO(CH_2)_nOH$ wherein $n$ is an integer from 2–10 inclusive, and a phosphorus compound from the group consisting of alkyl, alkyl phenyl, and phenyl phosphates and phosphites in the presence of catalytic amounts of an alkaline metal hydride from the group consisting of lithium, sodium and calcium hydrides.

Unexpectedly, I have discovered that the addition of an alkaline metal hydride such as lithium hydride to a reaction mixture of a glycol and an alkyl, alkyl phenyl, or phenyl phosphate or phosphite makes it possible to carry the reaction to a degree of greater completion. Whereas, a simple mixture of glycol and a phosphate or phosphite, and heating, resulted in carrying the reaction only to about 45% completion with excessive dehydration and darkening of the glycol. I have found that it is possible by the addition of catalytic amounts of the alkaline hydrides mentioned above to carry the reaction to 75%–80% completion with much less dehydration and darkening of the glycol.

Any phosphorus compound from the group consisting of alkyl, alkyl phenyl and phenyl phosphates and phosphites may be reacted in accordance with the process of this invention. As representative phosphorus compounds of the group, there may be mentioned: triphenyl phosphite, dibutyl phosphite, phenyl ethyl phosphite, tricresyl phosphate, diphenyl ethyl phosphate, diphenyl phosphate, etc. In place of individual compounds, mixtures of two or more of the phosphorus compounds may be reacted with a single glycol in the presence of the alkaline metal hydride catalyst.

For optimum results, the reaction mixture should preferably contain a ratio of 0.005–0.010 mole of alkaline metal hydride to 0.215 mole of alkyl, alkyl phenyl or phenyl phosphate or phosphite and 1.21–1.61 moles of the glycol. The reaction proceeds smoothly at temperatures of 188°–195° C., requiring about 3 hours to reach 75–80% completion. Attempts to carry out the reaction much beyond this point result in serious darkening of the reaction mixture. Higher temperatures lead to increased glycol dehydration.

Because of its commercial availability and cheapness, ethylene glycol constitutes the preferred member of the series of the formula $HO(CH_2)_nOH$, where $n$ is an integer from 2–10 inclusive. Examples of glycols which may be used in place of ethylene glycol are propylene glycol, tetramethylene glycol, hexamethylene glycol, etc.

The preferred alkaline metal hydride is lithium hydride. Preferably, about 5 mole per cent of catalyst, based on the phosphorus compound, should be employed. Smaller quantities lead to increased dehydration of glycol which, even in the presence of the catalyst, was found to be considerable. Increased catalytic quantities decrease dehydration. However, in certain chemical reactions, employing the products of the process of the present invention as chemical intermediates, increased amounts of catalyst may prove to be undesirable and would involve removal of the catalyst from the reaction system which might prove costly and impractical.

The following examples, wherein all quantities are expressed as parts by weight, employing ethylene glycol and tributyl phosphate as reactants, and lithium hydride as catalyst will serve to further illustrate the practice and principles of the present invention.

EXAMPLE 1

To an autoclave fitted with stirring means were added 75 parts (1.21 moles) of ethylene glycol. 0.08 part (.001 mole) of lithium hydride, which dissolved rapidly with stirring at room temperature, was then added. To this were then added 57.2 parts (0.215 mole) of tributyl phosphate, and heating was begun. The temperature of the reaction mixture rapidly increased to 196° C., and butanol started coming over. Two fractions were separated. The first of these which came over below 100° C. consisted of large quantities of water with a mixture of low boiling isomeric butanols. The principal distillate was collected below 120° C. and was collected at 110° C.–120° C. It consisted of butyl alcohol contaminated by 15–20% water. Fractionation of this distillate resulted in the separation of four fractions boiling in the ranges of the four isomeric butanols, each contaminated by water. The reaction was kept under total reflux whenever the temperature rose above 120° C. At the completion of the reaction which was made evident by the difficulty of keeping the reflux temperature below 120° C., heating stopped and the reaction mixture was allowed to cool under nitrogen. At this point, 63 parts of distillate had been collected; and, after correction for the water content, calculation for the extent of reaction indicated 82% completion. The total reaction time elapsed was three hours and five minutes.

The following table lists the results of the data accunulated from this example and four others run under almost identical conditions as noted.

Examples 2–5 listed in the table are run according to the process described in Example 1, with the exception that the glycol to phosphate ratio was varied as was the amount of catalyst added. In Examples 4 and 5, the amount of lithium hydride was reduced from 10 mole per cent to 5 mole per cent. In Examples 2 and 5, the glycol to phosphate ratio was increased from 1.21 moles of glycol for each 0.215 mole of tributyl phosphate (TBP–O) to 1.61 moles of glycol per 0.215 mole of (TBP–O). No attempt was made to isolate any of the individual products of the reaction, as this reaction mixture finds its main use per se as a chemical intermediate, or as an additive to polymerization reactions requiring fixed sources of phosphorus, and because of the high boiling point of the reaction mixture and its resulting tendency to decompose under high temperature distillation conditions.

Table.—*Exchange of tributyl phosphate with glycol*

| Example Number | Moles TBP–O [1] | Moles Glycol | Moles LiH | Time of Reaction | Percent Completion | Final Temperature (° C.) | Final Reaction Mixture (Color) |
|---|---|---|---|---|---|---|---|
| 1 | 0.215 | 1.21 | 0.01 | 3 hrs., 5 min | 82 | 209 | Pale Yellow. |
| 2 | 0.215 | 1.61 | 0.01 | 3 hrs., 35 min | 82 | 204 | Do. |
| 3 | 0.215 | 0.81 | 0.01 | 2 hrs., 18 min | 73 | 212 | Do. |
| 4 | 0.215 | 1.21 | 0.005 | 3 hrs. | 80 | 202 | Do. |
| 5 | 0.215 | 1.61 | 0.005 | 3 hrs., 20 min | 72 | 186 | Do. |

[1] TBP–O: tributyl phosphate.

The reaction products of the process of the invention, i. e., the interaction of alkyl, alkyl phenyl, and phenyl phosphates and phosphites with glycols are highly useful as intermediaries in chemical reactions necessitating fixed phosphorus content. They may also find use as modifiers and plasticizers in certain polymerization reactions. The relatively high boiling points of these reaction mixtures render them highly satisfactory as phosphate or phosphite additives in polymerization reactions where the polymerization mixture is subjected to a high vacuum.

I claim:

1. The process which comprises reacting a glycol of the series $HO(CH_2)_nOH$, wherein $n$ is an integer from 2–10 inclusive, with a phosphorus compound from the group consisting of alkyl, alkyl phenyl, and phenyl phosphates and phosphites in the presence of a catalyst from the group consisting of lithium, sodium and calcium hydrides.

2. The process of claim 1 wherein the catalyst is lithium hydride.

3. The process which comprises reacting a glycol of the series $HO(CH_2)_nOH$, wherein $n$ is an integer from 2–10 inclusive, with a phosphorus compound from the group consisting of alkyl, alkyl phenyl, and phenyl phosphates and phosphites in the presence of about 5 mole per cent, based on the phosphorus compound, of a catalyst from the group consisting of lithium, sodium and calcium hydrides.

4. The process of claim 3 wherein the catalyst is lithium hydride.

5. The process which comprises reacting ethylene glycol with a phosphorus compound from the group consisting of alkyl, alkyl phenyl, and phenyl phosphates and phosphites in the presence of a catalyst from the group consisting of lithium, sodium and calcium hydrides.

6. The process which comprises reacting ethylene glycol with a phosphorus compound from the group consisting of alkyl, alkyl phenyl, and phenyl phosphates and phosphites in the presence of about 5 mole per cent of lithium hydride based on the phosphorus compound.

7. The process which comprises reacting ethylene glycol with a trialkyl phosphate in the presence of a catalyst from the group consisting of lithium, sodium and calcium hydrides.

8. The process of claim 7 wherein the catalyst is lithium hydride.

9. The process of claim 7 wherein the trialkyl phosphate is tributyl phosphate.

10. The process of claim 9 wherein the catalyst is lithium hydride.

No references cited.